US008148858B2

(12) United States Patent
Hassett et al.

(10) Patent No.: US 8,148,858 B2
(45) Date of Patent: Apr. 3, 2012

(54) TOTALLY ENCLOSED HEAT PIPE COOLED MOTOR

(75) Inventors: Timothy Hassett, Santa Rosa, CA (US); Mark Hodowanec, Leesburg, VA (US)

(73) Assignee: HPEV, Inc., Wesley Chapel, FL (US)

(*) Notice: Subject to any disclaimer, the term of this patent is extended or adjusted under 35 U.S.C. 154(b) by 398 days.

(21) Appl. No.: 12/536,921

(22) Filed: Aug. 6, 2009

(65) Prior Publication Data
US 2010/0033042 A1 Feb. 11, 2010

Related U.S. Application Data

(60) Provisional application No. 61/086,694, filed on Aug. 6, 2008.

(51) Int. Cl.
*H02K 5/18* (2006.01)
(52) U.S. Cl. .............................. 310/52; 310/64; 310/58
(58) Field of Classification Search ............... 310/52–59, 310/60 A, 64
See application file for complete search history.

(56) References Cited

U.S. PATENT DOCUMENTS

| | | | |
|---|---|---|---|
| 1,329,247 A * | 1/1920 | Kuyser | 310/63 |
| 1,877,904 A * | 9/1932 | Laffoon | 310/63 |
| 2,556,435 A | 6/1951 | Moehri et al. | |
| 3,715,610 A | 2/1973 | Brinkman | |
| 3,765,480 A | 10/1973 | Fries | |
| 3,801,843 A | 4/1974 | Corman et al. | |
| 4,118,646 A | 10/1978 | Fleming et al. | |
| 4,217,513 A | 8/1980 | Kohzai et al. | |
| 4,270,064 A | 5/1981 | Glandorf et al. | |
| 4,322,646 A | 3/1982 | Persson | |
| 4,406,959 A | 9/1983 | Harano et al. | |
| 4,574,210 A | 3/1986 | Wieland | |
| 4,685,867 A | 8/1987 | Patun et al. | |
| 4,745,320 A | 5/1988 | Oyama et al. | |
| 5,140,204 A | 8/1992 | Cashmore et al. | |
| 5,220,978 A | 6/1993 | McMaster | |
| 5,223,757 A | 6/1993 | Staub et al. | |
| 5,394,040 A | 2/1995 | Khanh | |
| 5,552,988 A | 9/1996 | Kawaguchi et al. | |
| 5,808,387 A | 9/1998 | Akachi et al. | |
| 5,925,947 A | 7/1999 | Kajiwara et al. | |
| 6,339,269 B1 | 1/2002 | Hsiao | |

(Continued)

FOREIGN PATENT DOCUMENTS

GB 1489772 10/1977

(Continued)

*Primary Examiner* — Quyen Leung
*Assistant Examiner* — Naishadh Desai
(74) *Attorney, Agent, or Firm* — Polster, Lieder, Woodruff & Lucchesi, L.C.

(57) ABSTRACT

A totally enclosed motor comprising a housing totally encloses an electrical package that includes plurality of slot vents extending radially outward from a shaft on which the electrical package is mounted. The electrical package being operable to generate a closed circuit electrical package cooling air flow that circulates through the slot vents and is confined within the housing. The motor additionally including an exterior cooling assembly that is operable to generate a directed exterior air flow along an exterior portion of the housing. The motor further including a plurality of heat pipes having evaporator ends disposed within the closed circuit electrical package cooling air flow and condenser ends disposed within the exterior air flow, whereby heat is removed from the electrical package chamber such that the 'Totally Enclosed' more provides a power output substantially equivalent to that of an 'Open' motor of approximately the same size.

28 Claims, 7 Drawing Sheets

U.S. PATENT DOCUMENTS

| | | |
|---|---|---|
| 6,384,507 B1 | 5/2002 | Lee et al. |
| 6,499,532 B1 | 12/2002 | Williams |
| 6,509,665 B1 | 1/2003 | Nishiyama et al. |
| 6,528,909 B1 | 3/2003 | Kan et al. |
| 6,943,467 B2 | 9/2005 | Potoradi et al. |
| 7,411,323 B2 * | 8/2008 | Pfannschmidt et al. ........ 310/58 |
| 2004/0150270 A1 * | 8/2004 | Nagayama et al. ............. 310/61 |
| 2006/0001269 A1 | 1/2006 | Jansen et al. |
| 2006/0055256 A1 * | 3/2006 | Kreitzer .......................... 310/59 |
| 2006/0066155 A1 | 3/2006 | Matin et al. |
| 2006/0076841 A1 * | 4/2006 | Kreitzer .......................... 310/59 |
| 2006/0226717 A1 * | 10/2006 | Nagayama et al. ............. 310/58 |
| 2007/0024129 A1 * | 2/2007 | Pfannschmidt et al. ........ 310/59 |

FOREIGN PATENT DOCUMENTS

| | | |
|---|---|---|
| JP | 9-246056 | 9/1997 |

* cited by examiner

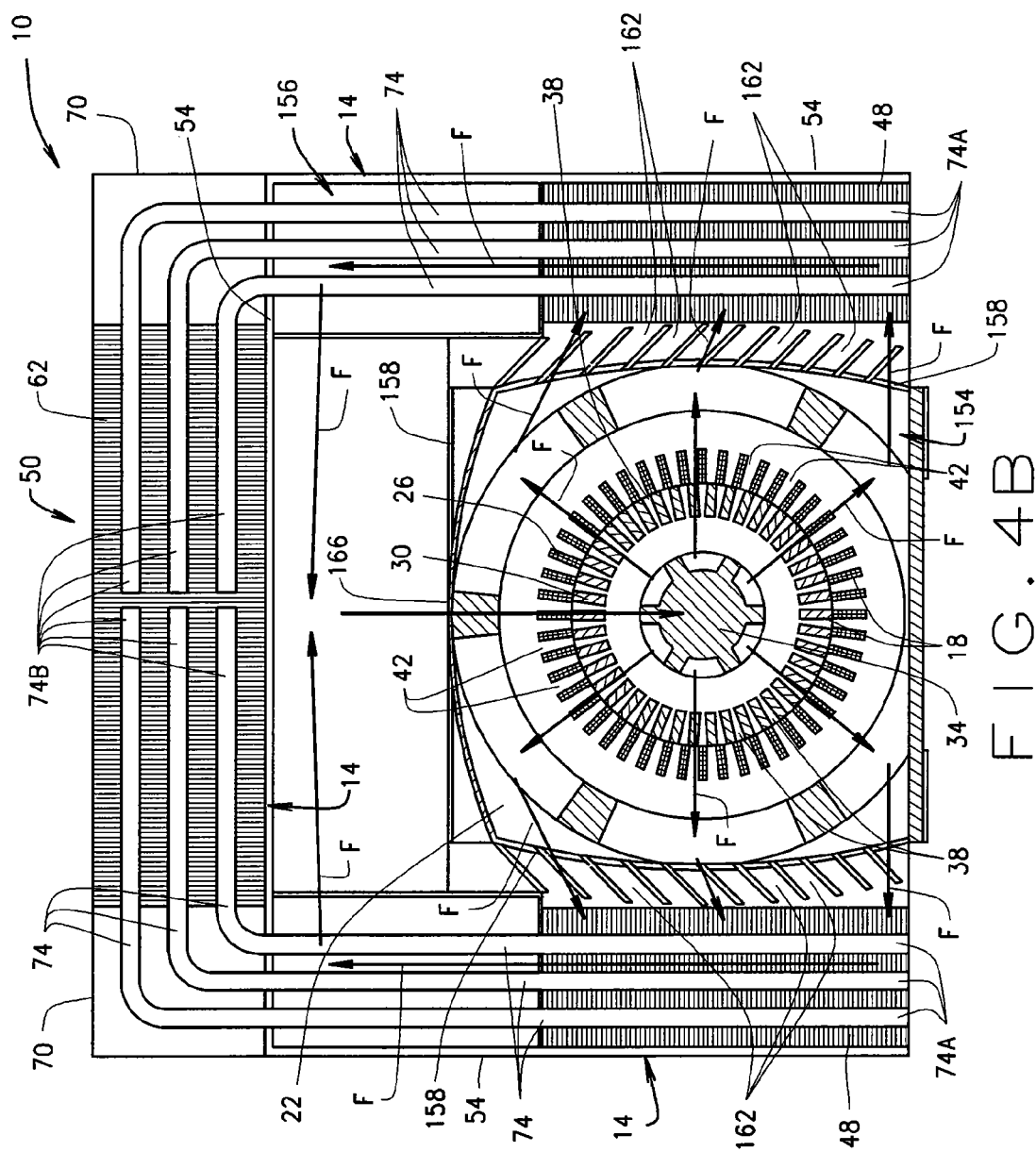

TOTALLY ENCLOSED HEAT PIPE COOLED MOTOR

CROSS-REFERENCE TO RELATED APPLICATIONS

This application claims the benefit of U.S. Provisional Application No. 61/086,694, filed on Aug. 6, 2008. The disclosure of the above application is incorporated herein by reference in its entirety.

Additionally, the present application is related in general subject matter to the following applications, each of which is hereby incorporated by reference, in their entirety, into the present application: U.S. application Ser. No. 11/765,140, filed Jun. 19, 2007; U.S. application Ser. No. 12/352,301, filed Jan. 12, 2009; U.S. application Ser. No. 12/418,162, filed Apr. 3, 2009; U.S. application Ser. No. 12/533,236, filed Jul. 31, 2009; and U.S. application Ser. No. 12/533,245, filed Jul. 31, 2009.

FIELD

The present teachings relate to systems and method for cooling electrical motors and generators.

BACKGROUND

The statements in this section merely provide background information related to the present disclosure and may not constitute prior art.

Electric motors and generators are used for a multitude of tasks and commonly generate significant heat during operation. Typically, motors are constructed to have an 'Open' architecture or a 'Totally Enclosed' architecture. Generally, the architecture, i.e., the construction, of 'Open' motors comprise a motor housing, or enclosure, including a plurality of air flow ports or openings that allow air from the ambient exterior environment to be drawn into and exhausted from the motor enclosure to cool the electrical package of the machine (i.e., the rotor and stator). More particularly, motors having the 'Open' architecture include an electrical package wherein the rotor and stator each include radial vents that allow the cool air drawn in from the ambient exterior environment to flow through the radial vents, and hence, radially through the rotor and stator, to directly cool the electrical package.

Conversely, the motor housing of a 'Totally Enclosed' motor completely encloses the electrical package such that there is no free exchange of air from the ambient exterior environment into the motor housing. Additionally, motors having known 'Totally Enclosed Fan Cooled' motor architecture generally have no internal air circulation path for directly cooling the electrical package. Rather, the electrical packages of known totally enclosed motors are indirectly cooled by directing an air flow over and through heat exchanging vanes formed on the exterior of the motor housing. Since the electrical packages of known 'Totally Enclosed Fan Cooled' motors are not directly cooled by air, the rotors and stators do not include radial vents, such as those of motors having the typical 'Open' motor architecture.

As is known in the art of motors, the efficiency, and power output, i.e., power density, of a motor is directly affected by the temperature of the motor, e.g., the temperature of the electrical package, during operation of the motor. That is, motors are thermally limited such that the amount of power output by a motor is a function of how well the heat can be removed from the electrical package. Generally, a motor will operate more efficiently, and produce more power at cooler temperatures than the same motor operated at higher temperatures. Typically, 'Open' motor architecture provides better cooling than 'Totally Enclosed' motor architecture. Hence, 'Open' motors generally operate more efficiently and have a higher power density than 'Totally Enclosed' motors of substantially the same size.

Generally, an 'Open' motor can have 30% to 40% greater power density than most 'Totally Enclosed' motors of the substantially the same size. However, the air intake openings in the motor housing, and the intake of air, of 'Open' motors can allow debris to abrade, foul, contaminate, corrode, and/or damage the respective electrical package, thereby diminishing the performance of the motor. Known 'Totally Enclosed' motors are not subject to such damage by debris, but their efficiency and power output are constrained by their limited cooling ability and increased operating temperature.

SUMMARY

In various embodiments, the present disclosure provides a heat pipe cooled totally enclosed motor. Generally, the motor comprises a housing totally encloses an electrical package that includes plurality of slot vents extending radially outward from a shaft on which the electrical package is mounted. The electrical package being operable to generate a closed circuit electrical package cooling air flow that circulates through the slot vents and is confined within the housing. The motor additionally including an exterior cooling assembly that is operable to generate a directed exterior air flow along an exterior portion of the housing. The motor further including a plurality of heat pipes having evaporator ends disposed within the closed circuit electrical package cooling air flow and condenser ends disposed within the exterior air flow, whereby heat is removed from the electrical package chamber such that the 'Totally Enclosed' more provides a power output substantially equivalent to that of an 'Open' motor of approximately the same size.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 4B is a cross-sectional end view of the horizontal TEHPC motor shown in FIG. 4A, in accordance with various embodiments of the present disclosure.

Corresponding reference numerals indicate corresponding parts throughout the several views of drawings.

DETAILED DESCRIPTION

Figure 1:
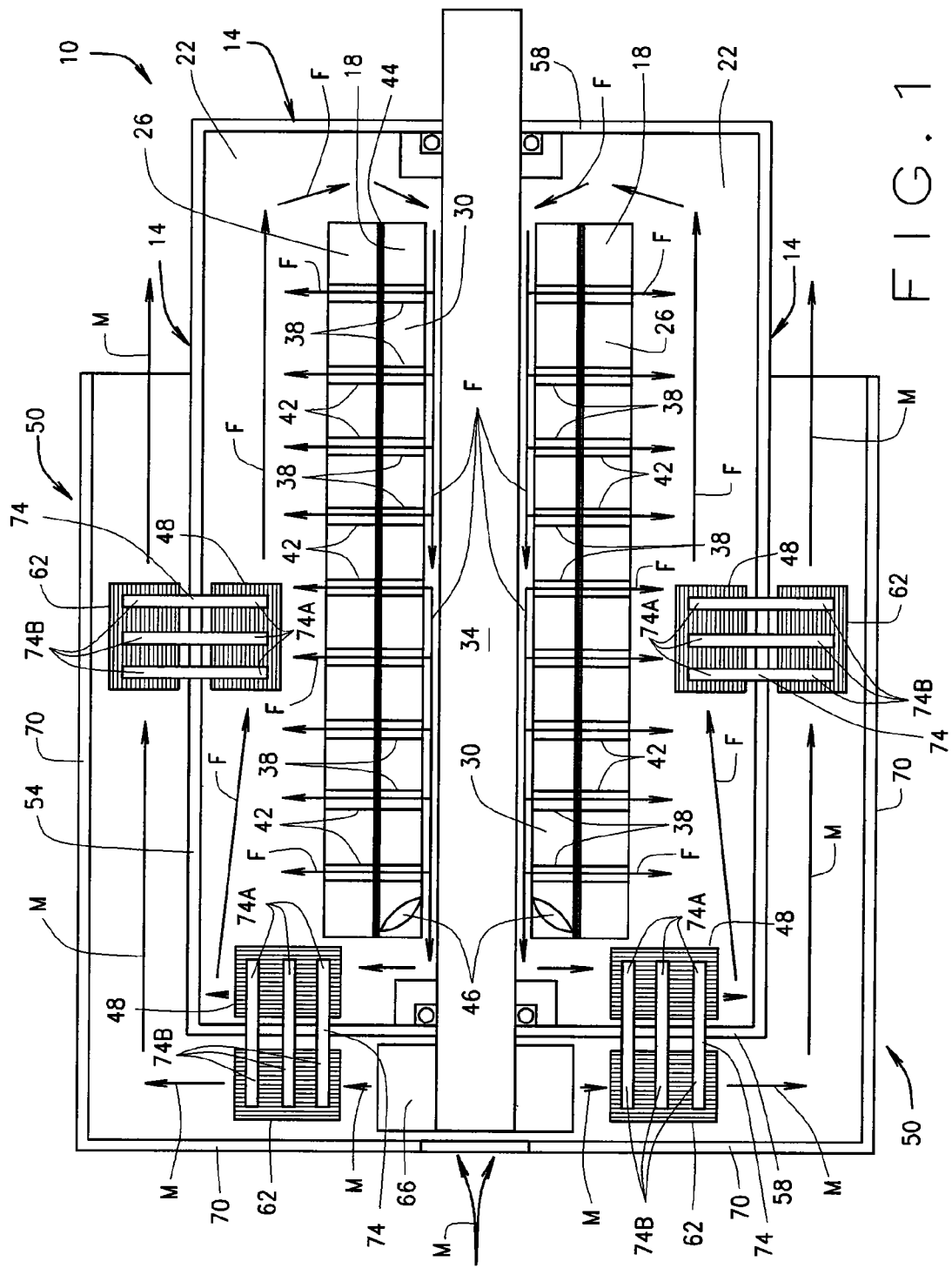
FIG. 1 is a cross-sectional top view of an exemplary totally enclosed heat pipe cooled (TEHPC) motor, in accordance with various embodiments of the present disclosure.

The following description is merely exemplary in nature and is in no way intended to limit the present teachings, application, or uses. Throughout this specification, like reference numerals will be used to refer to like elements.

FIG. 1 is an illustration of an exemplary totally enclosed heat pipe cooled (TEHPC) motor 10, in accordance with various embodiments of the present disclosure. The TEHPC includes a total enclosure housing, or frame, 14 that totally encloses an electrical package 18 within a closed interior electrical package chamber 22 such that there is no free exchange of air between an ambient exterior environment of the TEHPC motor 10 and the electrical package chamber 22. The electrical package 18 comprises a stator 26 fixedly mounted within the housing 14, and a rotor 30 rotationally mounted within the housing 14 via a shaft 34 rotationally disposed, i.e., located, placed and oriented, within housing 14. Operationally, the electrical package 18 is structured and operable to rotate within the electrical package chamber 22 to produce electrical or mechanical power output by the TEHPC motor 10.

Importantly, the rotor 30 includes a plurality of rotor slot vents 38, i.e., rotor open air passages, that extend through the rotor 30 radially outward from the shaft 34. Although not shown, in various implementations, the shaft 34 and/or laminations of the rotor 30 can include axial vents, or grooves, that allow air to flow axially from the end(s) of the rotor 30 to the radial rotor slot vents 38. Similarly, the stator 26 includes a plurality of stator slot vents 42, i.e., stator open air passages, that extend through the stator 26 radially outward from the shaft 34. In various embodiments, the rotor and stator slot vents 38 and 42 are collinearly aligned so as to comprehensively form slot vents, i.e., open air passages, that extend radially outward through the entire electrical package 18. Alternatively, in various embodiments, the rotor and stator slot vents 38 and 42 are not coaxially aligned. In such instances, the air flows through the rotor slot vents 38, down an air gap 44, i.e., a small radial space between the stator 26 and the rotor 30 and then through the stator slot vents 42.

In various embodiments, the electrical package 18 can additionally include a plurality of cooling fan blades 46 disposed on and/or within the rotor 30. During operation of the TEHPC motor 10 the cooling fan blades 46 rotate along with the rotor 30 to generate a closed circuit electrical package cooling air flow F that is confined within and circulates within the electrical package chamber 22 to cool the electrical package 18. Due to the confinement within the electrical package chamber 22, the electrical package cooling air flow F is a closed circuit air flow that is continuously recirculated through and around the electrical package 18.

Figure 2A:
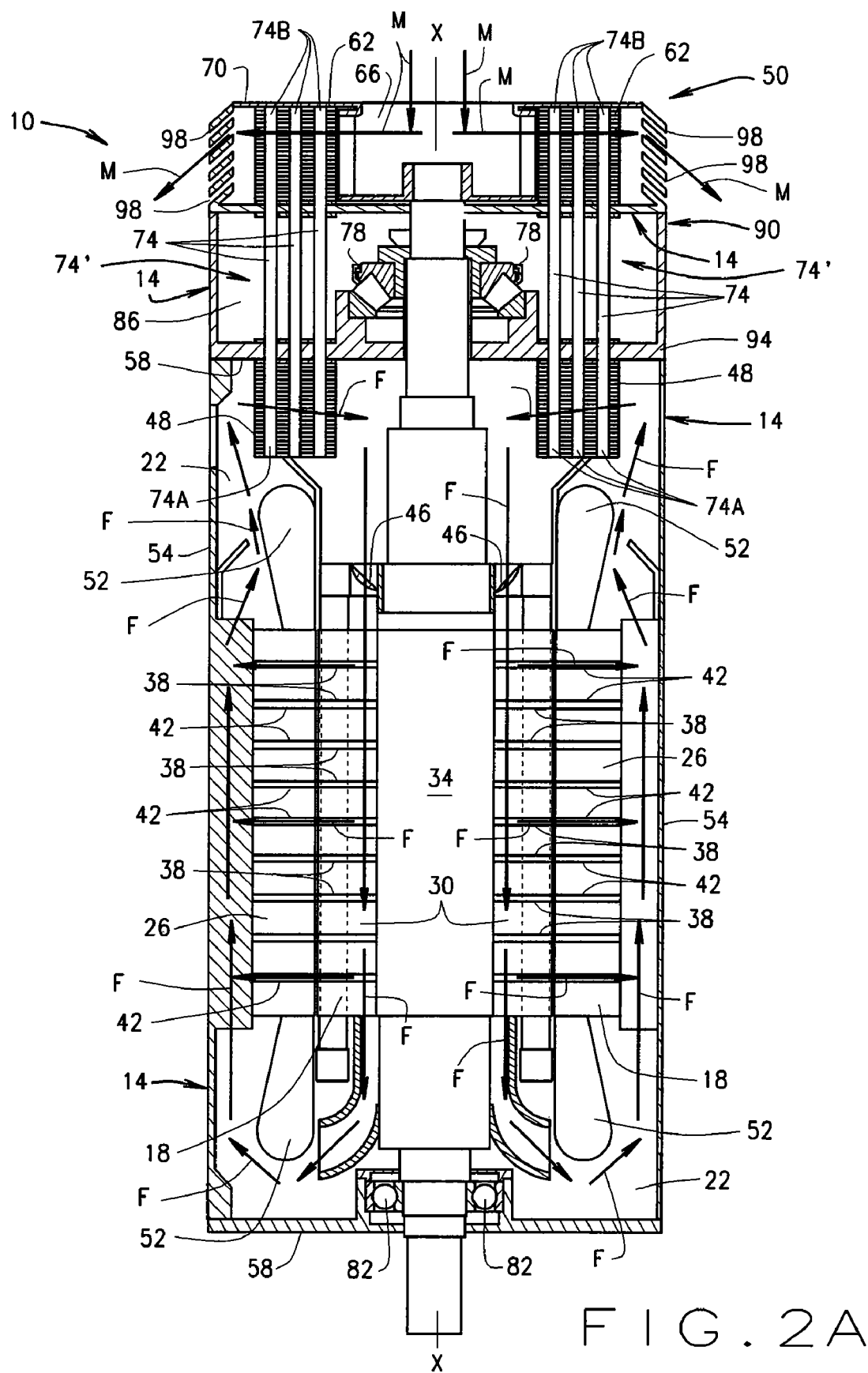
FIG. 2A is a cross-sectional side view of the TEHPC motor shown in FIG. 1 configured as a vertical TEHPC motor, in accordance with various embodiments of the present disclosure.

Importantly, during operation of the TEHPC motor 10 the closed circuit electrical package cooling air flow F is generated, e.g., generated by the cooling fan blades 46. The closed circuit electrical package cooling air flow F circulates longitudinally along the shaft 34, then flows radially outward from the shaft through the plurality of rotor slot vents 38 and through the stator slot vents 42. Thus, the closed circuit electrical package cooling air flow F flows directly across a coil, i.e., windings, of the electrical package 18. Although the coil is not illustrated, one skilled in the art would clearly and readily understand the location and function of the coil within the electrical package 18. However, a coil head 52 is shown in FIG. 2A to aid in the understanding of the location of the coil within the electrical package 18, the coil being disposed between longitudinally opposing coil heads 52. After passing radially outward from the shaft 34 through the electrical package 18 and directly across the coil, the closed circuit electrical package cooling air flow F flows along an outer periphery of the electrical package 18 and then longitudinally back along the shaft and radially outward through the slot vents again.

Thus, the closed circuit electrical package cooling air flow F is continuously recirculated around and radially outward through electrical package 18, i.e., radially outward from the shaft 34 through the rotor and stator vent slots 38 and 42, while being confined within the electrical package chamber 22 by the total enclosure housing 14.

Additionally, the TEHPC motor 10 includes at least one interior heat exchanger 48 disposed within the electrical package chamber 22 such that the closed circuit electrical package cooling air flow F passes through the interior heat exchanger(s) 48.

The TEHPC motor 10 further includes an exterior cooling assembly 50 that is disposed exteriorly of the housing 14 on at least a portion of a motor housing longitudinal sidewall 54 and/or at least a portion of one of opposing motor housing distal end walls 58. In various embodiments, the exterior cooling assembly 50 includes at least one exterior heat exchanger 62 and a fan 66 that is mounted to a distal end of the shaft 34 that extends through one of the distal end walls 58 of the motor housing 14. The fan 66 is structured and operable to generate an exterior air flow M along an exterior portion of the motor housing sidewall 54 and/or one of the distal end walls 58. More particularly, the exterior air flow M is directed along an exterior portion of the motor housing sidewall 54 and/or one of the distal end walls 58 via an assembly housing 70 such that the exterior air flow M passes through the exterior heat exchanger(s) 62 that is/are disposed between the assembly housing 70 and the motor housing sidewall 54 and/or one of the motor housing distal end walls 58. During operation of the TEHPC motor 10, the fan 66 rotates with the shaft 34 and generates the exterior air flow M by drawing in air from the ambient environment, forcing the air along the exterior of the motor housing 14 and through the exterior heat exchanger, as described above, then exhausting the air back into the ambient environment. It should be understood that the exterior air flow M is completely separate and isolated from the closed circuit electrical package cooling air flow F, which is confined within the electrical package chamber 22.

Furthermore, the TEHPC motor 10 includes a plurality of heat pipes 74 connecting the interior heat exchanger(s) 48 with the exterior heat exchanger(s) 62. Generally, heat pipes, such as heat pipes 74, are a heat transfer mechanisms that transport large quantities of heat with a very small difference in temperature between hot and cold interfaces, e.g., between the electrical package chamber 22 and the exterior cooling assembly 50.

Each heat pipe 74 comprises an evaporator end 74A that is disposed within a respective one of the interior heat exchanger(s) 48 and a condenser end 74B disposed within a respective one of the exterior heat exchanger(s) 62. Accordingly, the evaporator ends 74A of each heat pipe 74 are disposed within the closed circuit electrical package cooling air flow F such that heat is removed from the electrical package chamber 22, and the condenser ends 74B are disposed within the exterior air flow M such that heat is removed from the heat pipe condenser ends 74B. Therefore, the heat pipes 74 remove heat from the electrical package chamber 22.

Importantly, the heat pipes 74, having their evaporator and condenser ends 74A and 74B respectively disposed within the interior and exterior heat exchangers 48 and 62, as described herein, remove heat from the electrical package chamber 22 at a rate substantially equivalent to that of known 'Open' motors. Moreover, the TEHPC motor 10, as described herein is structured and operable to provide an efficiency and power output, i.e., power density, substantially equivalent to that of a known 'Open' motor of substantially the same size. Additionally, the total enclosure housing, or frame, 14 prevents debris from entering the electrical package chamber 22, thereby protecting the electrical package 18 from abrasion, fouling, contamination, corrosion, and/or damage that could be caused by such debris.

Referring now to FIG. 2A, in various embodiments, the TEHPC motor 10 can be configured as a vertical motor that includes shaft bearings 78 and 82, wherein bearing 78 comprises an upper antifriction shaft thrust bearing or a fluid-film bearing, and bearing 82 is a lower guide bearing. To cool and lubricate the bearing 78, the bearing 78 is disposed within an oil chamber 86 of a bearing housing 90 disposed at a top end of the TEHPC motor 10. The bearing housing 90 and oil chamber 86 are separated from the electrical package chamber 22 by a bearing housing plate 94 which defines a top one of the opposing motor housing distal end walls 58.

Additionally, in such embodiments, the TEHPC vertical motor 10 can include a plurality of interior heat exchangers 48 disposed at the motor housing top distal end wall 58. Furthermore, the plurality of heat pipes 74 can comprise a plurality of sets of heat pipes 74' wherein each set of heat pipes 74' comprises a plurality of heat pipes 74 having the respective evaporator ends 74A disposed within a respective one of the interior heat exchangers 48. Still further, in such embodiments, the fan 66 is mounted to an end of the motor shaft 34 that extends through the shaft bearing oil chamber 86, and the exterior cooling chamber housing 70 comprises a vented housing that includes a plurality of exhaust vents 98. Further yet, in such embodiments, the TEHPC vertical motor 10 can include a plurality of exterior heat exchangers 62 disposed within the vented housing 70 such that the external air flow M is directed through the exterior heat exchangers 62, each having the condenser ends 74B of a respective set 74' of heat pipes disposed therein.

During operation of the TEHPC vertical motor 10 the shaft 34 and rotor 30 rotate about an axis X of the shaft 34, relative to the fixed stator 26. More particularly, the fan 66 is mounted to the shaft 34 such that as the shaft 34 and rotor 30 rotate about the axis X, the fan 66 also rotates about the axis X drawing in ambient air and generating the exterior air flow M. The exterior cooling assembly housing 70 directs the exterior air flow M through the exterior heat exchangers 62, across the heat pipe condenser ends 74B, and out a plurality of exhaust vents 98 of the exterior cooling assembly housing 70, thereby removing heat from heat pipe condenser ends 74B at a highly efficient rate.

Also, during operation of the TEHPC vertical motor 10 a significant amount heat is generated within the electrical package chamber 22 that can affect the efficiency and power output, i.e., power density, of the TEHPC vertical motor 10. To remove such heat from the electrical package chamber, thereby improving the power density of the TEHPC vertical motor 10, rotation of the rotor 30, and in various embodiments, rotation of the rotor cooling fan blades 46, generate the closed circuit electrical package cooling air flow F. As described above, the total enclosure housing 14 confines the closed circuit electrical package cooling air flow F within the electrical package chamber 22 such that the closed circuit electrical package cooling air flow F circulates longitudinally along the shaft 34 and then flows radially outward from the shaft through the plurality of rotor and stator slot vents 38 and 42. Subsequently, the closed circuit electrical package cooling air flow F passes along an outer periphery of the electrical package 18, through the interior heat exchangers 48 and across the heat pipe evaporator ends 74A, and then longitudinally back along the shaft and radially outward through the slot vents again, thereby removing heat from the electrical package 18 and chamber 22 at a highly efficient rate.

More specifically, as the exterior air flow M passes through the exterior heat exchangers 62 and over the heat pipe condenser ends 74B, the exterior air flow M removes heat from, i.e., cools, the heat pipe condenser ends 74B, thereby cooling the heat pipe evaporator ends 74A. Moreover, cooling the heat pipe evaporator ends 74A removes heat from, i.e., cools, the electrical package 18 and chamber 22, via the passing of the closed circuit electrical package cooling air flow F radially outward through the rotor and stator slots 38 and 42, and then through the interior heat exchangers 48 and across the heat pipe evaporator ends 74A.

Figure 2B:
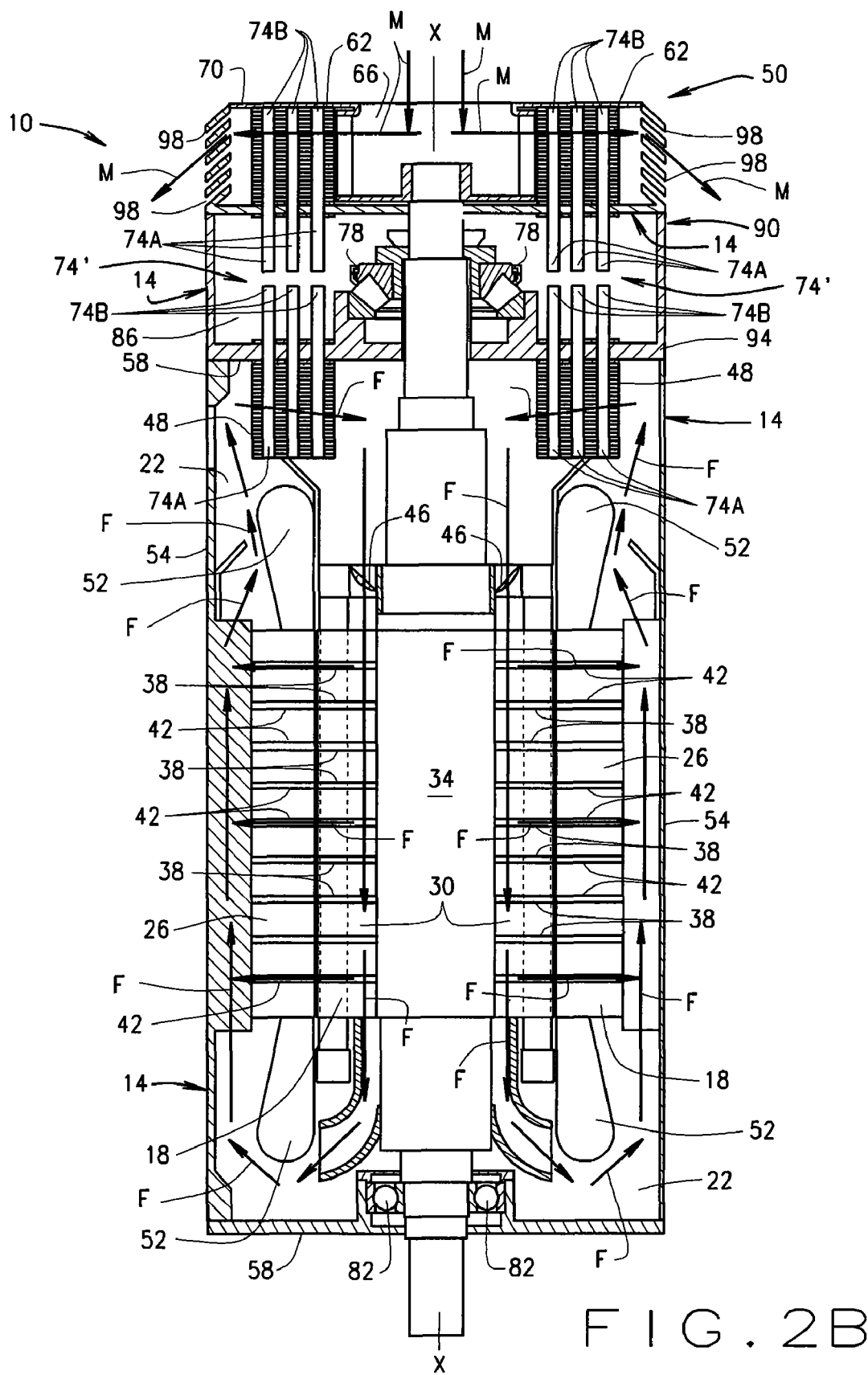
FIG. 2B is a cross-sectional side view of the TEHPC motor shown in FIG. 1 configured as a vertical TEHPC motor, in accordance with various other embodiments of the present disclosure.

In various embodiments, exemplarily illustrated in FIG. 2B, each heat pipe 74 does not necessarily need to extend from the respective interior heat exchanger 48, through the oil chamber 86 into the respective exterior heat exchanger 62. Rather, the plurality of heat pipes 74 can include interior heat exchanger heat pipes 74 and a plurality of exterior heat exchanger heat pipes 74. The evaporator end 74A of each interior heat exchanger heat pipe 74 is disposed within the respective interior heat exchanger 48 and the condenser end 74B of each interior heat exchanger heat pipe 74 is disposed within the oil chamber 86, and not in contact with any of the exterior heat exchanger heat pipes. Conversely, the evaporator end 74A of each exterior heat exchanger heat pipe 74 is disposed within the oil chamber 86 and the condenser end 74B of each exterior heat exchanger heat pipe 74 is disposed within the respective exterior heat exchanger 62, and not in contact with any of the interior heat exchanger heat pipes.

Figure 3A:
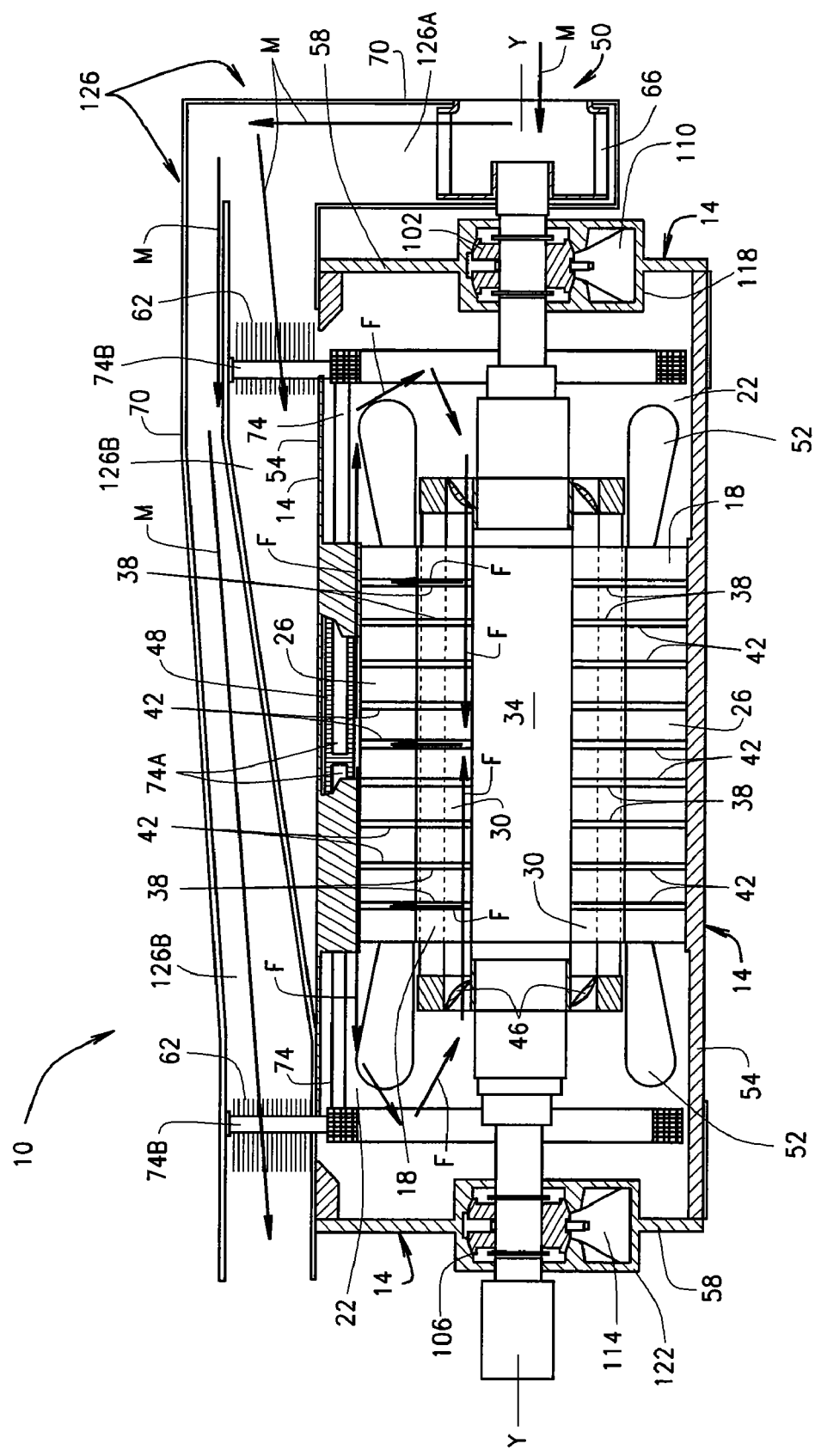
FIG. 3A is a cross-sectional side view of the TEHPC motor shown in FIG. 1 configured as a horizontal TEHPC motor, in accordance with various embodiments of the present disclosure.
Figure 3B:
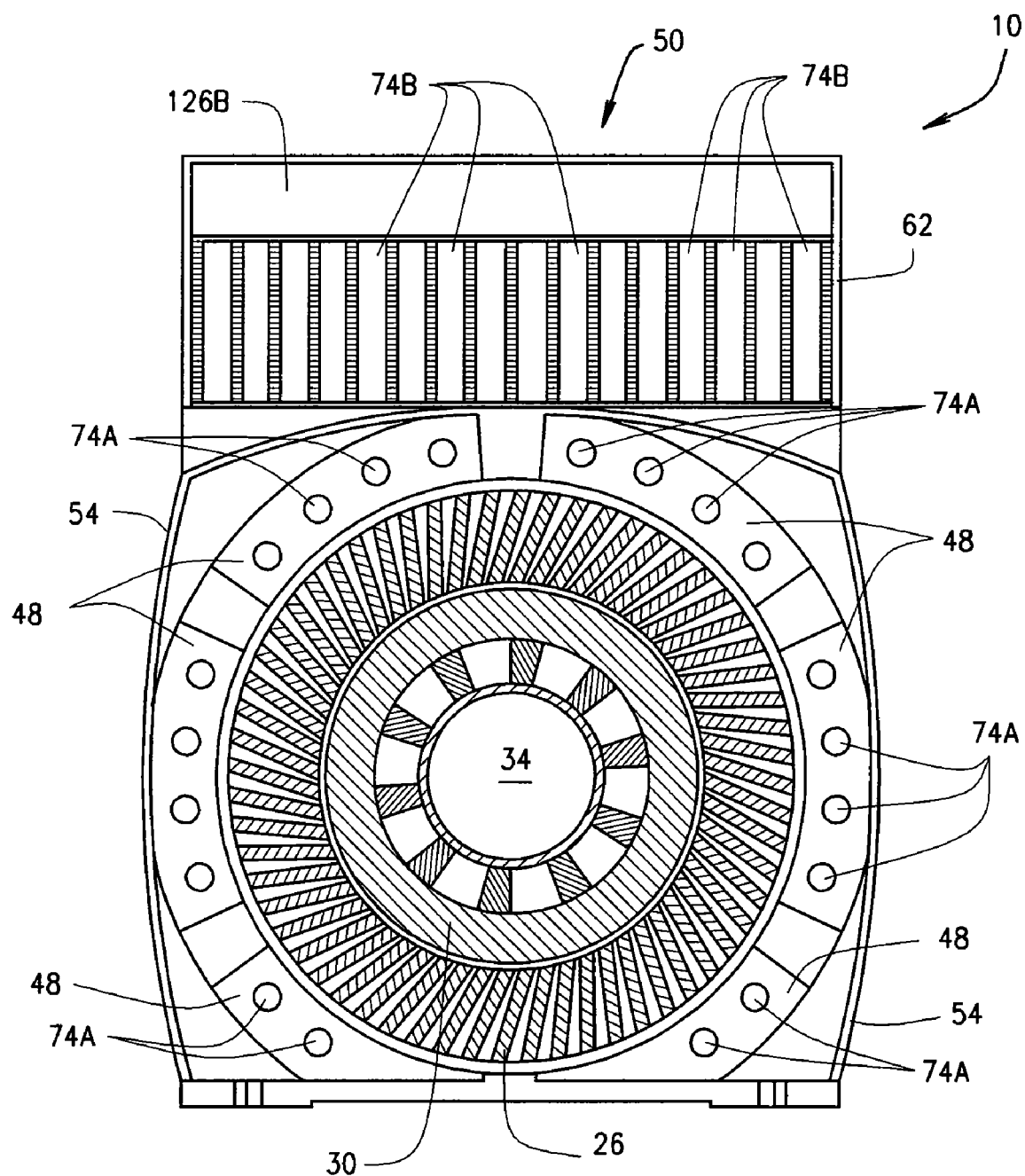
FIG. 3B is a cross-sectional end view of the TEHPC horizontal motor shown in FIG. 3A, in accordance with various embodiments of the present disclosure.

Referring now to FIGS. 3A and 3B, in various embodiments, the TEHPC motor 10 can be configured as a horizontal motor that includes shaft bearings 102 and 106 that are disposed within respective oil sumps 110 and 114 formed within respective bearing housings 118 and 122 that are each disposed at respective ones of the opposing motor housing end walls 58. Each oil sump 110 and 114 is filled with oil that lubricates and cools the respective bearings 102 and 106 during operation of the horizontal TEHPC motor 10. During operation, the shaft 34 and rotor 30 rotate about an axis Y of the shaft 34, relative to a fixed stator 26 of the electrical package 18.

Additionally, in such embodiments, the at least one interior heat exchangers 48 of the TEHPC horizontal motor 10 can comprise at least one heat exchanger longitudinally disposed radially within the electrical package chamber 22 adjacent the electrical package 18 between the motor housing sidewall 54 and the electrical package 18. The heat pipes evaporator ends 74A are disposed within the at least one arcuate interior heat exchangers 48. Furthermore, in such embodiments, the fan 66 is mounted to an end of the motor shaft 34 extending through the shaft bearing housing 118.

Further yet, in such embodiments, the exterior cooling assembly 50 can be structured to include an air duct 126 having a first leg 126A in which the fan 66 is disposed and a second leg 126B orthogonally extending from the first leg 126A and longitudinally disposed along an exterior surface of the housing sidewall 54. Still further, in such embodiments, the exterior cooling assembly 50 includes a plurality of exterior heat exchangers 62 disposed within the second leg 126B of the air duct 126, in which the heat pipe condenser ends 74B are disposed.

During operation of the TEHPC horizontal motor 10 the shaft 34 and rotor 30 rotate about an axis Y of the shaft 34, relative to the fixed stator 26. More particularly, the fan 66 is mounted to the shaft 34 such that as the shaft 34 and rotor 30 rotate about the axis Y, the fan 66 also rotates about the axis Y drawing in ambient air and generating the exterior air flow M. The air duct first and second legs 126A and 126B direct the exterior air flow M through the exterior heat exchangers 62, across the heat pipe condenser ends 74B, and out exhaust end of the air duct second leg 126B, thereby removing heat from heat pipe condenser ends 74B at a highly efficient rate.

Also, during operation of the TEHPC horizontal motor 10 a significant amount heat is generated within the electrical package chamber 22 that can affect the efficiency and power output, i.e., power density, of the TEHPC horizontal motor 10. To remove such heat from the electrical package chamber 22, thereby improving the power density of the TEHPC horizontal motor 10, rotation of the rotor 30, and in various embodiments, rotation of the rotor cooling fan blades 46, generate the closed circuit electrical package cooling air flow F. As described above, the total enclosure housing 14 confines the closed circuit electrical package cooling air flow F within the electrical package chamber 22 such that the closed circuit electrical package cooling air flow F circulates longitudinally along the shaft 34 and then flows radially outward from the shaft through the plurality of rotor and stator slot vents 38 and 42. Subsequently, the closed circuit electrical package cooling air flow F passes along an outer periphery of the electrical package 18, through the interior heat exchangers 48 and across the heat pipe evaporator ends 74A, and then longitudinally back along the shaft and radially outward through the slot vents again, thereby removing heat from the electrical package 18 and chamber 22 at a highly efficient rate.

More specifically, as the exterior air flow M passes through the exterior heat exchangers 62 and over the heat pipe condenser ends 74B, the exterior air flow M removes heat from, i.e., cools, the heat pipe condenser ends 74B, thereby cooling the heat pipe evaporator ends 74A. Moreover, cooling the heat pipe evaporator ends 74A removes heat from, i.e., cools, the electrical package 18 and chamber 22, via the passing of the closed circuit electrical package cooling air flow F radially outward through the rotor and stator slots 38 and 42, and then through the interior heat exchangers 48 and across the heat pipe evaporator ends 74A.

Figure 4A:
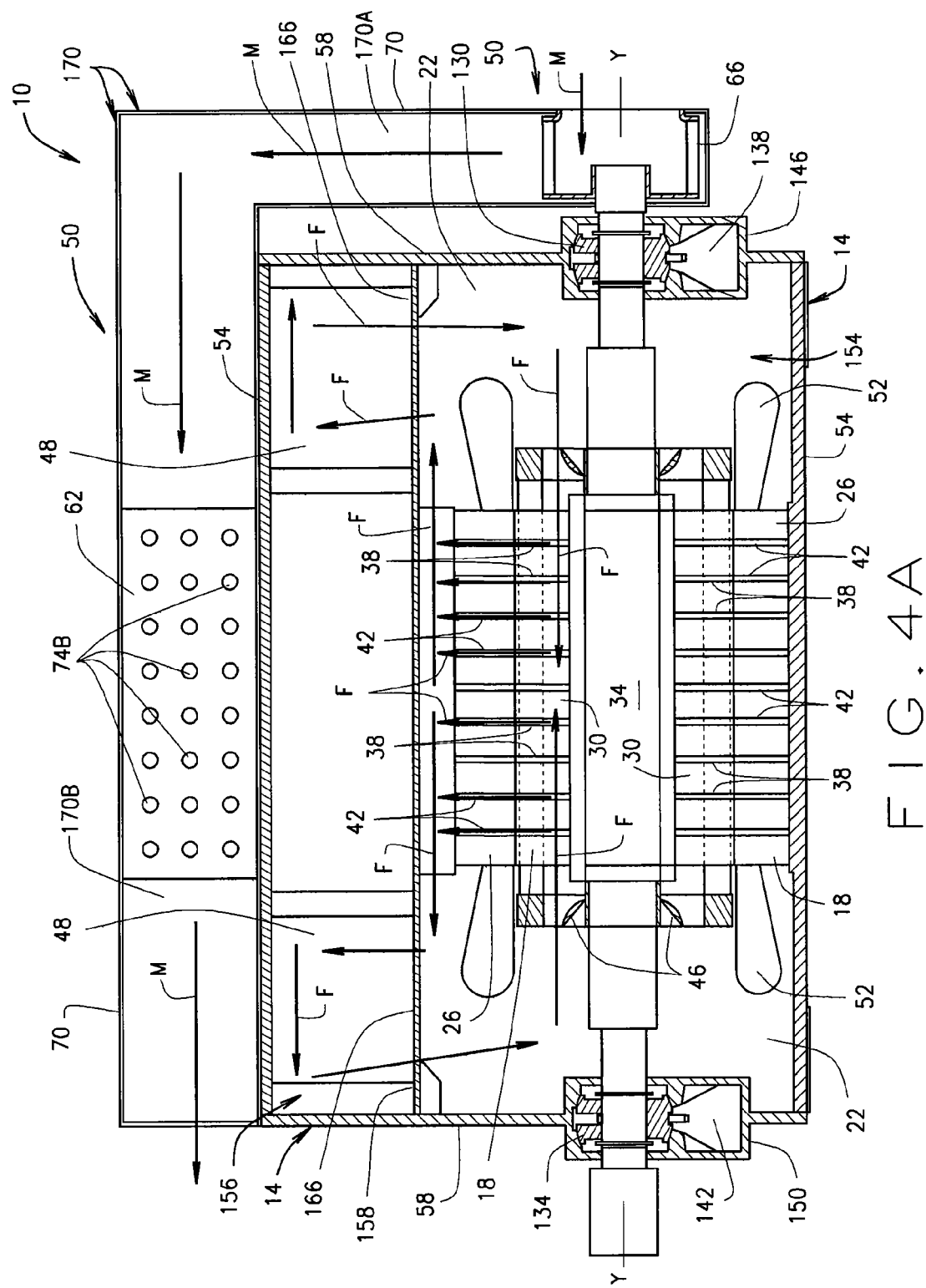
FIG. 4A is a cross-sectional side view of the TEHPC motor shown in FIG. 1 configured as a horizontal TEHPC motor, in accordance with various other embodiments of the present disclosure.

Referring now to FIGS. 4A and 4B, in various other embodiments, the TEHPC motor 10 can be configured as a horizontal motor that includes shaft bearings 130 and 134 that are disposed within respective oil sumps 138 and 142 formed within respective bearing housings 146 and 150 that are each disposed at respective ones of the opposing motor housing end walls 58. Each oil sump 138 and 142 is filled with oil that lubricates and cools the respective bearings 130 and 134 during operation of the horizontal TEHPC motor 10. During operation, the shaft 34 and rotor 30 rotate about an axis Y of the shaft 34, relative to a fixed stator 26 of the electrical package.

In such embodiments, the total enclosure housing 14 can comprise a first interior compartment 154 and a second interior compartment 156. The first interior compartment 154 includes a plurality of longitudinal sidewalls 158 that define the electrical package chamber 22, wherein at least one of the interior compartment sidewalls 158 includes a plurality of exhaust ports 162 through which the closed circuit electrical package cooling air flow F passes after flowing radially outward through the rotor and stator slot vents 38 and 42. The second interior compartment 156 envelopes the first interior compartment 154 about at least a portion of the interior compartment sidewalls 158. The second interior compartment 156 is structured to direct the closed circuit electrical package cooling air flow F that exits, via the exhaust ports 162, back into the second interior compartment 156 through one or more air flow windows 166 included in at least one of the interior compartment sidewalls 158.

Additionally, in such embodiments, the horizontal TEHPC motor 10 can include at least one interior heat exchanger 48 disposed within the second interior compartment 156 adjacent the exhaust ports 162, wherein the heat pipe evaporator ends 74A are disposed within the interior heat exchanger(s) 48. Furthermore, in such embodiments, the exterior cooling assembly fan 66 is mounted to an end of the motor shaft 34 extending through the shaft bearing housing 146 and the exterior cooling assembly 50 can be structured to include an air duct 170 having a first leg 170A in which the fan 66 is disposed and a second leg 170B orthogonally extending from the first leg 170A and longitudinally disposed along an exterior surface of a sidewall of the second interior compartment 156. Still further, in such embodiments, the exterior cooling assembly 50 includes at least one exterior heat exchanger 62 disposed within the second leg 170B of the air duct 170, in which the heat pipe condenser ends 74B are disposed.

During operation of the horizontal TEHPC motor 10 the shaft 34 and rotor 30 rotate about an axis Y of the shaft 34, relative to the fixed stator 26. More particularly, the fan 66 is mounted to the shaft 34 such that as the shaft 34 and rotor 30 rotate about the axis Y, the fan 66 also rotates about the axis Y drawing in ambient air and generating the exterior air flow M. The air duct first and second legs 170A and 170B direct the exterior air flow M through the exterior heat exchangers 62, across the heat pipe condenser ends 74B, and out exhaust end of the air duct second leg 170B, thereby removing heat from heat pipe condenser ends 74B at a highly efficient rate.

Also, during operation of the horizontal TEHPC motor 10 a significant amount heat is generated within the electrical package chamber 22 that can affect the efficiency and power output, i.e., power density, of the horizontal TEHPC motor 10. To remove such heat from the electrical package chamber 22, thereby improving the power density of the horizontal TEHPC motor 10, rotation of the rotor 30, and in various embodiments, rotation of the rotor cooling fan blades 46, generate the closed circuit electrical package cooling air flow F. As described above, the total enclosure housing 14, comprising the first and second interior compartments 154 and 156, confines the closed circuit electrical package cooling air flow F within the electrical package chamber 22 such that the closed circuit electrical package cooling air flow F circulates longitudinally along the shaft 34 and then flows radially outward from the shaft through the plurality of rotor and stator slot vents 38 and 42. Subsequently, the closed circuit electrical package cooling air flow F passes along an outer periphery of the electrical package 18 and through the air flow windows 166 where the closed circuit electrical package cooling air flow F passes through the interior heat exchangers 48 disposed within the second interior compartment 156 and across the heat pipe evaporator ends 74A. Then the closed circuit electrical package cooling air flow F flows longitudinally back along the shaft and radially outward through the slot vents again, thereby removing heat from the electrical package 18 and chamber 22 at a highly efficient rate.

More specifically, as the exterior air flow M passes through the exterior heat exchangers 62 and over the heat pipe condenser ends 74B, the exterior air flow M removes heat from, i.e., cools, the heat pipe condenser ends 74B, thereby cooling the heat pipe evaporator ends 74A. Moreover, cooling the heat pipe evaporator ends 74A removes heat from, i.e., cools, the electrical package 18 and chamber 22, via the passing of the closed circuit electrical package cooling air flow F radially outward through the rotor and stator slots 38 and 42, and then through the interior heat exchangers 48 and across the heat pipe evaporator ends 74A.

Accordingly, the TEHPC motor 10, as described in the various embodiments herein, is structured as 'Totally Enclosed' motor, wherein there is no free exchange of air between an ambient exterior environment of the TEHPC motor 10 and the electrical package chamber 22. Moreover, the TEHPC motor 10, as described in the various embodiments herein, is structured and operable such that the flow of the exterior air flow M through the exterior heat exchanger(s) 62, and the circulation of the closed circuit electrical package cooling air flow F through the interior heat exchanger(s) 48, which is thermally coupled to the exterior heat exchanger(s) 62 via the heat pipes 74, efficiently removes heat from the electrical package chamber 22 and a very high rate. Thus, during operation, the power output by the TEHPC motor 10 is substantially equivalent to an 'Open' motor of approximately the same size, i.e., a different motor having approximately the same size electrical package and a respective housing structured so that there is free exchange of air between an ambient exterior environment and a respective interior electrical package chamber of the different motor.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A totally enclosed motor comprising:
    a housing structured such that there is no free exchange of air between an ambient exterior environment of the motor and an interior electrical package chamber within the housing;
    an electrical package enclosed within the electrical package chamber of the housing, the electrical package structured and operable to rotate within the electrical package chamber to produce electrical or mechanical power output by the motor, and to generate a closed circuit electrical package cooling air flow that circulates longitudinally along a shaft of the motor then flows radially outward through a plurality of slot vents formed within the electrical package then flows along a outer periphery of the electrical package and then longitudinally back along the shaft, the electrical package cooling air circuit confined within the housing;
    an exterior cooling assembly disposed exteriorly of the housing and structured and operable to generate a directed exterior air flow along an exterior portion of the housing, the exterior air flow being separate and isolated from the closed circuit electrical package cooling air flow; and
    a plurality of heat pipes, each heat pipe comprising:
        a respective evaporator end disposed within the electrical package chamber and within the closed circuit electrical package cooling air flow such that heat is removed from the electrical package chamber; and
        a respective condenser end disposed within the exterior cooling assembly and within the exterior air flow such that heat is removed from the heat pipe condenser ends.

2. The motor of claim 1 further comprising at least one interior heat exchanger disposed within the closed circuit electrical package cooling air flow and having the heat pipe evaporator ends disposed therein, and wherein the exterior cooling assembly comprises at least one exterior heat exchanger disposed within the exterior air flow and having the heat pipe condenser ends disposed therein.

3. The motor of claim 2, wherein the at least one interior heat exchanger comprises a plurality of interior heat exchangers disposed at a distal end of the electrical package chamber, and the plurality of heat pipes comprises a plurality of sets of heat pipes wherein each set of heat pipes comprises a plurality of heat pipes having the respective evaporator ends disposed within a respective one of the interior heat exchangers.

4. The motor of claim 3, wherein the exterior cooling assembly comprises:
    a fan mounted to an end of the motor shaft extending through a shaft bearing disposed at a distal end of the motor housing, wherein the fan is structured and operable to generated the exterior air flow; and
    a vented housing disposed at a distal end of a bearing housing of the motor and enclosing the fan.

5. The motor of claim 4, wherein the at least one exterior heat exchanger comprises a plurality of exterior heat exchangers disposed within the vented housing such that the external air flow is directed through the exterior heat exchangers, wherein each exterior heat exchanger has the condenser ends of a respective set of heat pipes disposed therein.

6. The motor of claim 2, wherein the at least one interior heat exchanger comprises at least one arcuate heat exchanger longitudinally disposed radially adjacent the electrical package within the electrical package chamber between a sidewall of the housing and the electrical package, the evaporator ends of the heat pipes disposed within the at least one arcuate heat exchanger.

7. The motor of claim 6, wherein the exterior cooling assembly comprises:
    a fan mounted to an end of the motor shaft extending through a shaft bearing disposed at a distal end of the motor housing, wherein the fan is structured and operable to generated the exterior air flow; and
    an air duct having a first leg in which the fan is disposed and a second leg longitudinally disposed along an exterior surface of the housing sidewall.

8. The motor of claim 7, wherein the at least one exterior heat exchanger comprises a plurality of exterior heat exchangers disposed within the second leg of the air duct such that the external air flow is directed through the exterior heat exchangers.

9. The motor of claim 2, wherein the housing comprises:
    a first interior compartment that includes a plurality of longitudinal sidewalls that define the electrical package chamber, at least one of the first interior compartment sidewalls including a plurality of exhaust ports through which the closed circuit electrical package cooling air flow passes after flowing radially outward through the electrical package slot vents; and
    a second interior compartment that envelopes the first interior compartment about at least a portion of a plurality of the first interior compartment sidewalls, the second interior compartment structured to direct the closed circuit electrical package cooling air flow that exits the first interior compartment, via the exhaust ports, back into the first interior compartment via one or more air flow windows included in at least one of the interior compartment sidewalls.

10. The motor of claim 9, wherein the at least one interior heat exchanger comprises at least one interior heat exchanger disposed within the second interior compartment adjacent the exhaust ports of the at least one first interior compartment sidewalls, the evaporator ends of the heat pipes disposed within the at least one interior heat exchanger.

11. The motor of claim 10, wherein the exterior cooling assembly comprises:
a fan mounted to an end of the motor shaft extending through a shaft bearing housing disposed at a distal end of the motor housing, wherein the fan is structured and operable to generated the exterior air flow; and
an air duct having a first leg in which the fan is disposed and a second leg longitudinally disposed along an exterior surface of a sidewall of the second interior compartment.

12. The motor of claim 11, wherein the at least one exterior heat exchanger comprises at least one exterior heat exchanger disposed within the second leg of the air duct such that the external air flow is directed through the at least one exterior heat exchanger.

13. The motor of claim 1, wherein the structure of the motor, whereby the flow of the exterior air flow across the heat pipe condenser ends and the circulation of the closed circuit electrical package cooling air flow across the heat pipe evaporator ends, removes heat from the electrical package chamber such that during operation of the motor, the power output by the motor is approximately equivalent to a different motor having approximately the same size electrical package and a respective housing structured such that there is free exchange of air between an ambient exterior environment of the different motor and a respective interior electrical package chamber of the different motor.

14. The motor of claim 1, wherein the plurality of heat pipes comprise:
a plurality of interior heat exchanger heat pipes, each having a respective evaporator end disposed within the electrical package chamber and within the closed circuit electrical package cooling air flow such that heat is removed from the electrical package chamber, and a respective condenser end disposed within a bearing oil chamber of the motor; and
a plurality of exterior heat exchanger heat pipes, each having a respective evaporator end disposed within the bearing oil chamber, and a respective condenser end disposed within the exterior air flow such that heat is removed from the exterior heat exchanger heat pipe condenser ends.

15. A totally enclosed motor comprising:
a housing structured such that there is no free exchange of air between an ambient exterior environment of the motor and an interior electrical package chamber within the housing;
an electrical package enclosed within the electrical package chamber of the housing, the electrical package structured and operable to rotate within the electrical package chamber to produce electrical or mechanical power output by the motor, and to generate a closed circuit electrical package cooling air flow that circulates longitudinally along a shaft on which the electrical package is mounted then flows radially outward from the shaft through a plurality of slot vents formed within a rotor and a stator of the electrical package and extend radially outward from the shaft, then flows along a outer periphery of the electrical package then longitudinally back along the shaft and radially outward through the slot vents again, the electrical package cooling air circuit confined within the housing;
at least one interior heat exchanger disposed within the electrical package chamber such that the closed circuit electrical package cooling air flow passes through the at least one interior heat exchanger;
an exterior cooling assembly disposed exteriorly of the housing and including at least one exterior heat exchanger, the exterior cooling assembly structured and operable to generate a directed exterior air flow that passes through the at least one exterior heat exchanger and along an exterior portion of the housing, the exterior air flow being separate and isolated from the closed circuit electrical package cooling air flow; and
a plurality of heat pipes, each heat pipe comprising:
a respective evaporator end disposed within the at least one interior heat exchanger and within the closed circuit electrical package cooling air flow such that heat is removed from the electrical package chamber; and
a respective condenser end disposed within the at least one exterior heat exchanger and within the exterior air flow such that heat is removed from the heat pipe condenser ends.

16. The motor of claim 15, wherein the at least one interior heat exchanger comprises a plurality of interior heat exchangers disposed at a distal end of the electrical package chamber, and the plurality of heat pipes comprises a plurality of sets of heat pipes wherein each set of heat pipes comprises a plurality of heat pipes having the respective evaporator ends disposed within a respective one of the interior heat exchangers.

17. The motor of claim 16, wherein the exterior cooling assembly comprises:
a fan mounted to an end of the motor shaft extending through a shaft bearing disposed at a distal end of the motor housing, wherein the fan is structured and operable to generated the exterior air flow; and
a vented housing disposed at a distal end of a bearing housing of the motor and enclosing the fan.

18. The motor of claim 17, wherein the at least one exterior heat exchanger comprises a plurality of exterior heat exchangers disposed within the vented housing such that the external air flow is directed through the exterior heat exchangers, wherein each exterior heat exchanger has the condenser ends of a respective set of heat pipes disposed therein.

19. The motor of claim 15, wherein the at least one interior heat exchanger comprises at least one arcuate heat exchanger longitudinally disposed radially adjacent the electrical package within the electrical package chamber between a sidewall of the housing and the electrical package, the evaporator ends of the heat pipes disposed within the at least one arcuate heat exchanger.

20. The motor of claim 19, wherein the exterior cooling assembly comprises:
a fan mounted to an end of the motor shaft extending through a shaft bearing disposed at a distal end of the motor housing, wherein the fan is structured and operable to generated the exterior air flow; and
an air duct having a first leg in which the fan is disposed and a second leg longitudinally disposed along an exterior surface of the housing sidewall.

21. The motor of claim 20, wherein the at least one exterior heat exchanger comprises a plurality of exterior heat exchangers disposed within the second leg of the air duct such that the external air flow is directed through the exterior heat exchangers.

22. The motor of claim 15, wherein the housing comprises:
a first interior compartment that includes a plurality of longitudinal sidewalls that define the electrical package chamber, at least one of the first interior compartment sidewalls including a plurality of exhaust ports through which the closed circuit electrical package cooling air flow passes after flowing radially outward through the electrical package slot vents; and
a second interior compartment that envelopes the first interior compartment about at least a portion of a plurality of the first interior compartment sidewalls, the second interior compartment structured to direct the closed circuit electrical package cooling air flow that exits the first interior compartment, via the exhaust ports, back into the first interior compartment via one or more air flow windows included in at least one of the first interior compartment sidewalls.

23. The motor of claim 22, wherein the at least one interior heat exchanger comprises at least one interior heat exchanger disposed within the second interior compartment adjacent the exhaust ports of the at least one first interior compartment sidewalls, the evaporator ends of the heat pipes disposed within the at least one interior heat exchanger.

24. The motor of claim 23, wherein the exterior cooling assembly comprises:
a fan mounted to an end of the motor shaft extending through a shaft bearing housing disposed at a distal end of the motor housing, wherein the fan is structured and operable to generated the exterior air flow; and
an air duct having a first leg in which the fan is disposed and a second leg longitudinally disposed along an exterior surface of a sidewall of the second interior compartment.

25. The motor of claim 24, wherein the at least one exterior heat exchanger comprises at least one exterior heat exchanger disposed within the second leg of the air duct such that the external air flow is directed through the at least one exterior heat exchanger.

26. The motor of claim 15, wherein the structure of the motor, whereby the flow of the exterior air flow through the at least one exterior heat exchanger and the circulation of the closed circuit electrical package cooling air flow through the at least interior heat exchanger that is thermally coupled to the at least one exterior heat exchanger via the heat pipes, removes heat from the electrical package chamber such that during operation of the motor, the power output by the motor is substantially equivalent to a different motor having approximately the same size electrical package and a respective housing structured such that there is free exchange of air between an ambient exterior environment of the different motor and a respective interior electrical package chamber of the different motor.

27. The motor of claim 15, wherein the plurality of heat pipes comprise:
a plurality of interior heat exchanger heat pipes, each having a respective evaporator end disposed within the electrical package chamber and within the closed circuit electrical package cooling air flow such that heat is removed from the electrical package chamber, and a respective condenser end disposed within a bearing oil chamber of the motor; and
a plurality of exterior heat exchanger heat pipes, each having a respective evaporator end disposed within the bearing oil chamber, and a respective condenser end disposed within the exterior air flow such that heat is removed from the exterior heat exchanger heat pipe condenser ends.

28. The motor of claim 15, wherein the exterior cooling assembly comprises a vented housing disposed at a distal end of a bearing housing of the motor, wherein the exterior air flow passes through the vented housing.

* * * * *